(12) United States Patent
Laughlin

(10) Patent No.: X9627
(45) Date of Patent: Apr. 28, 1836

(54) BEDSTEAD BOLTS

(76) Inventor: Ira M. Laughlin

United States Patent Patent No.: X9627

Ira M. Laughlin of Sunderland, Vermont.

Letters Patent.

The schedule referred to in these Letters Patent and making part of the same containing a description in the words of the said Ira M. Laughlin of his improvement in the manner of Bolting Bedstead Joints To all to whom these presents shall come, Be it known that I Ira M. Laughlin of Sunderland in the County of Bennington and State of Vermont, have invented a new and useful improvement in the manner of bolting bedstead joints and that the following is a full and exact description thereof. Pass an iron screw bolt diagonally through each post directly between the mortices which receive the tenons on the rails and also through the wood or iron bar framed into the rails, directly across the corner not so near as to touch the post, the bar may be curved so as to form a gentle hook on the ends that are received into the rails: By screwing the nut against the bar, the posts are held firmly against the shoulders of the rails.

What I claim as my own invention and not previously known in the above described bedstead is the peculiar manner in which one bolt is made to hold two joints

Ira M. Laughlin

Witness
Jonas Warner
Lemis Hood

[illegible]

255 [illegible]